(12) United States Patent
Liu et al.

(10) Patent No.: US 11,472,676 B2
(45) Date of Patent: Oct. 18, 2022

(54) NONLINEAR RESONANCE MODEL-BASED ACTIVE FILTERING CRANE STEEL ROPE RESONANCE ELIMINATION CONTROL METHOD

(71) Applicants: Wuhan University of Science and Technology, Wuhan (CN); Sinosteel Wuhan Safey & Environment Protection Research, Wuhan (CN)

(72) Inventors: Huikang Liu, Wuhan (CN); Sen Lin, Wuhan (CN); Xianhua Wang, Wuhan (CN); Qiangguang Lu, Wuhan (CN); Lin Chai, Wuhan (CN); Yikang Zu, Wuhan (CN); Zhou Zhou, Wuhan (CN); Dongtian Liu, Wuhan (CN); Qing Yu, Wuhan (CN); Weijia Wang, Wuhan (CN)

(73) Assignees: Wuhan University of Science and Technology, Wuhan (CN); Sinosteel Wuhan Safey & Environment Protection Research, Wuhan (CN)

( * ) Notice: Subject to any disclaimer, the term of this patent is extended or adjusted under 35 U.S.C. 154(b) by 0 days.

(21) Appl. No.: 17/389,309

(22) Filed: Jul. 29, 2021

(65) Prior Publication Data
US 2022/0144596 A1 May 12, 2022

(30) Foreign Application Priority Data

Nov. 12, 2020 (CN) .......................... 202011260485.X (51) Int. Cl.
*B66C 13/16* (2006.01)
*B66C 13/22* (2006.01)
*G06F 17/13* (2006.01)
*G06F 17/14* (2006.01)

(52) U.S. Cl.
CPC .............. *B66C 13/16* (2013.01); *B66C 13/22* (2013.01); *G06F 17/13* (2013.01); *G06F 17/14* (2013.01)

(58) Field of Classification Search
CPC ....... B66C 13/16; B66C 13/22; B66C 13/063; G06F 17/13; G06F 17/14; G06F 30/20; G06F 2119/14; H02P 21/22
See application file for complete search history.

(56) References Cited

FOREIGN PATENT DOCUMENTS

| CN | 207811983 U | 9/2018 |
|----|-------------|--------|
| CN | 110983839 A | 4/2020 |
| CN | 212741987 U | 3/2021 |

*Primary Examiner* — Tejal Gami (57) ABSTRACT

A nonlinear resonance model-based active filtering crane steel rope resonance elimination control method, including: constructing a two-dimensional dynamic model of a bridge crane according to a Lagrange's equation; constructing a steel wire rope-motor nonlinear resonance model to detect a harmonic; and eliminating the harmonic by means of active filtering. The present disclosure makes in-depth study on positioning of a crane and intelligent control of an anti-swing and resonance elimination control system and uses active filtering to eliminate resonance between a heavy object and the steel wire rope, thereby reducing a swinging angle and achieving the rapid resonance elimination and anti-swing effect. The active filtering technology can quickly and effectively detect a resonance current so as to effectively suppress resonance between the heavy object and the steel wire rope, and further helps a controller quickly and accurately position a trolley to further improve anti-swing performance.

4 Claims, 7 Drawing Sheets

Active filtering

FIG. 7

NONLINEAR RESONANCE MODEL-BASED ACTIVE FILTERING CRANE STEEL ROPE RESONANCE ELIMINATION CONTROL METHOD

CROSS-REFERENCE TO RELATED APPLICATIONS

The application claims priority to Chinese patent application No. 202011260485.X, filed on Nov. 12, 2020, the entire contents of which are incorporated herein by reference.

TECHNICAL FIELD

The present disclosure relates to the technical field of crane anti-swing, in particular to a nonlinear resonance model-based active filtering crane steel rope resonance elimination control method.

BACKGROUND

With the rapid development of China's economy, the application of cranes in infrastructure projects is increasing day by day. The crane is a typical under-actuated electro-mechanical integration system, which is widely used to handle materials in sites such as a cargo warehouse, a dock, a warehouse, a large ship, a workshop, a building, and a factory building, and is important equipment to achieve mechanization of material handling in a factory, a railway, a port and other sections. As a heavy construction machine, the crane plays an extremely important role in fields of logistics, construction, metallurgy, manufacturing, etc., and its main task is to quickly and accurately carry goods to a target location and make swinging of the goods as small as possible.

Usually, a trolley and a load hoisting device of the crane are skillfully connected via a flexible steel rope, which reduces the starting load of the crane, improves the flexibility of loading and unloading goods of the crane and reduces the power consumption of the system. However, during the operation of the trolley, cart or main hoist, and especially in the starting and braking phases, due to the flexible connection structure, dynamic characteristics of the trolley hoisting system and external interference factors, and especially due to inertia forces and wind loads, goods such as containers will move like a single pendulum in a vertical plane. In a special case, when swinging of the steel wire rope and swinging of the goods hoisted by the steel wire rope form a resonance condition, the swinging degree of the hoisted goods is greatly increased, difficulties in accurate alignment of the crane and rapid stacking of the goods are increased, overturning of the crane may occur, and thus the work efficiency of the system is reduced. Therefore, the crane cannot meet the requirements of rapid and safe loading and unloading in modern times. In manual operation, an experienced operator can make a judgment according to the size of a workspace for goods, the allowable swinging degree and operation conditions of a crane, adjust the operating speed of the trolley in real time according to a swinging angle during the movement of the hoisted goods, and therefore control a deflection angle (i.e. the swinging angle) of the hoisted goods within a small range. However, these measures can hardly achieve expected anti-swing effects, and specifically have the following defects: 1) higher requirements are put forward to workers, and the workers often need additional training to accumulate relevant experience; 2) the work efficiency is reduced, the anti-swing effect is poor, and if the swinging angle is reduced only by the air resistance after swing occurs, the time for one hoisting will be greatly increased; 3) accurate positioning is difficult to achieve, so it is often necessary to repeatedly adjust the trolley to move when the load is about to be transported to a destination; and 4) the safety factor is low, and accidents occur frequently.

Therefore, it is increasingly important to achieve accurate positioning, dynamic tracking and process control of cranes, which helps to improve loading and unloading efficiency, reduce operating costs, achieve stable anti-swing control and rapid and accurate positioning control of the crane system, and ensure the safety of people's lives and properties.

SUMMARY

To solve the above problems, an objective of the present disclosure is to provide a nonlinear resonance model-based active filtering crane steel rope resonance elimination control method.

A nonlinear resonance model-based active filtering crane steel rope resonance elimination control method, comprising the following steps:

S1: constructing a two-dimensional dynamic model of abridge crane according to a Lagrange's equation;

S2: constructing a steel wire rope-motor nonlinear resonance model to detect a harmonic; and S3: eliminating the harmonic by means of active filtering.

Further, the nonlinear resonance model-based active filtering crane steel rope resonance elimination control method, wherein the dynamic model in S1 is specifically as follows:

$$\begin{cases} (M+m)\ddot{x} + mL\ddot{\theta}\cos\theta - mL\dot{\theta}^2\sin\theta_1 + f_r = F \\ l^2\ddot{\theta} + \cos\theta\ddot{x} + gL\sin\theta = 0 \end{cases} \quad (1\text{-}1)$$

therefore, the dynamic model of the crane is as follows:

$$\begin{cases} \ddot{x} = \dfrac{F - mg\sin\theta\cos\theta - ml\dot{\theta}^2\sin\theta - \mu\dot{x}}{M + m\sin^2\theta} \\ \ddot{\theta} = \dfrac{F - mg\sin\theta\cos^2\theta - ml\dot{\theta}\sin\theta\cos\theta}{(M + m\sin^2\theta)l} \\ \quad - \dfrac{Mg\sin\theta + mg\sin^3\theta}{(M + m\sin^2\theta)l} \end{cases} \quad (1\text{-}2)$$

if the output torque of the motor is represented by $T_m$, according to an equation of $T_m = F*r_1$, the following equation is obtained:

$$F = \frac{T_m}{r_1} \quad (1\text{-}3)$$

where $r_1$ represents a radius of a motor shaft.

Further, the nonlinear resonance model-based active filtering crane steel rope resonance elimination control method, wherein the steel wire rope-motor nonlinear resonance model in S2 comprises a motor-drum model and a drum-steel wire rope model; the resonance torque on the motor shaft is not completely equal to the resonance torque on the steel wire rope, a non-linear functional relationship exists, and through derivation and calculation, an equation is a second-order differential equation:

$$T_{eh}=f(T_h) \quad (1\text{-}4)$$

where the resonance torque on the motor shaft is represented by $T_{eh}$, and the resonance torque on the steel wire rope is represented by $T_{Lh}$;

the motor-drum model is obtained by simplifying a main transmission system of the crane to a two-mass system composed of an alternating current asynchronous motor and a drum which are connected via an elastic shaft, and ignoring the damping of the connecting shaft;

kinetic energy E and potential energy V of the two-mass system areas follows, respectively:

$$E=1/2 J_m (k\dot{\theta}_d)^2+1/2 J_L \dot{\theta}_d^2 \quad (1\text{-}5)$$

$$V=1/2 K_s (K\theta_d-\theta_d) \quad (1\text{-}6)$$

a Lagrange function L of the system is expressed as:

$$L=T-V \quad (1\text{-}7)$$

system damping is ignored, and the generalized torque is defined as:

$$Q_i = \sum_{i=1}^{2} F_i \frac{\partial \theta_i}{\partial q_j} \quad (1\text{-}8)$$

where 1=1,2; j=1,2; $\theta_1=k\theta_d$; $\theta_2=\theta_d$; $q_j$ represents a generalized coordinate; and $F_1$ represents the generalized external torque;

in an ideal case (that is, without considering the resonance), the generalized external torque is defined as:

$$\begin{cases} F_1 = T_e \\ F_2 = T_L \end{cases} \quad (1\text{-}9)$$

according to the Lagrange theorem, a Lagrange equation of the system is as follows:

$$\frac{d}{dt}\left(\frac{\partial L}{\partial \dot{\theta}_i}\right) - \frac{\partial L}{\partial \theta_i} + \frac{\partial F}{\partial \theta_i} = Q_i \ (i=1,2) \quad (1\text{-}10)$$

equations (1-5) to (1-9) are substituted into equation (1-10), and an electromechanical coupling nonlinear dynamic equation of the main transmission system of the crane can be obtained:

$$\begin{cases} T_e - T_s = J_m k \ddot{\theta}_d \\ T_s = K_s(k\theta_d - \theta_d) \\ T_s - T_L = J_L \ddot{\theta}_d \end{cases} \quad (1\text{-}11)$$

where $k\ddot{\theta}_d$ and $\ddot{\theta}_d$ represent rotational angular acceleration of the motor and rotational angular acceleration of the drum (rad/s$^2$), respectively.

equation (1-11) is simplified to obtain:

$$T_e - T_L = J_m k \ddot{\theta}_d + J_L \ddot{\theta}_d \quad (1\text{-}12)$$

in practice, the resonance torque generated by the resonance between a hoisted object and the steel wire rope cannot be ignored. The output torque of the motor is required to be $T_e$, but due to the resonance, the actual output of the motor is as follows:

$$T_{e\Sigma}=T_e+T_{eh} \quad (1\text{-}13)$$

$T_{e\Sigma}$ represents the sum of the torque on the motor shaft; equation (1-13) still satisfies (1-12), then:

$$T_{e\Sigma}-T_{L\Sigma}=J_m k \ddot{\theta}_d + J_L \ddot{\theta}_d \quad (1\text{-}14)$$

$T_{L\Sigma}$ represents the sum of the torque on the steel wire rope;

$$T_{L\Sigma}=T_L+T_{Lh} \quad (1\text{-}15)$$

to make the output torque of the motor still be $T_e$, the torque $T_{eh}$ generated by the resonance needs to be eliminated, and the output torque of the motor after resonance elimination control is as follows:

$$T'_{e\Sigma}=T_{e\Sigma}-T_{eh}=T_e+T_{eh}-T_{eh}=T_e \quad (1\text{-}16)$$

because $T_L$ represents the load torque, in the process of hoisting the heavy object by the crane, the mass of the heavy object does not change, and $T_L$ does not change. However, the resonance torque $T_{Lh}$ will be affected by wind force, an unsmooth gear and other factors, so $T_{Lh}$ changes all the time, where:

$$T_{Lh}=m \cdot \ddot{\varphi}(x,y,z) \cdot l_F \quad (1\text{-}17)$$

where $\ddot{\varphi}(x,y,z)$ represents the vibration acceleration (a second-order derivative of a vibration equation $\varphi(x,y,z)$ with respect to time) of the steel wire rope; $l_F$ represents an arm of force of the resonance torque on the steel wire rope; and m represents the mass of the steel wire rope;

because a vibration in a z axis direction is small and can be ignored, and the torque in an x axis direction and a y axis direction are substantially the same, a vibration equation $\varphi(x)$ in the X axis direction and a vibration equation $\varphi(y)$ in the y axis direction on the steel wire rope are the same;

therefore, the resonance torque $T_{Lh}$ on the steel wire rope can be obtained only by knowing the vibration equation (i.e. the equation $\varphi(x)$) of the steel wire rope;

the drum-steel wire rope model comprises construction of motion equations, simplification of the motion equations and an analytical solution of a vibration equation;

the construction of the motion equations is that: an equivalent dynamic model for the vibration of the steel wire rope in the process of hoisting the heavy object by the steel wire rope at a uniform speed is analyzed according to the Hamilton principle, and a mathematical model is constructed; and the simplification of the motion equations is that: a time variable and a space variable in the derived motion equations are coupled. To separate the time variable and the space variable in the motion equations and eliminate the time variable, it is assumed that a time function is a harmonic function, and a Kantorovich time averaging method is used to obtain a dynamic nonlinear equation with only the space variable.

The present disclosure has the following beneficial effects:

the present disclosure provides a nonlinear resonance model-based active filtering crane steel rope resonance elimination control method. Compared with the prior art, the present disclosure has carried out in-depth research on the positioning of a crane and the intelligent control of an anti-swing and resonance elimination control system, and uses an active filtering technology to eliminate the resonance between a heavy object and a steel wire rope, thereby reducing a swinging angle and achieving a rapid resonance elimination and anti-swing effect. A harmonic current can be quickly and effectively detected through the active filtering technology, so that the resonance between the steel wire rope and the heavy object is effectively suppressed. Moreover, the active filtering technology further helps a controller quickly and accurately position a trolley, thereby further improving anti-swing performance.

DETAILED DESCRIPTION OF THE EMBODIMENTS

The present disclosure will be further described below with reference to the accompanying drawings.

Figure 1:
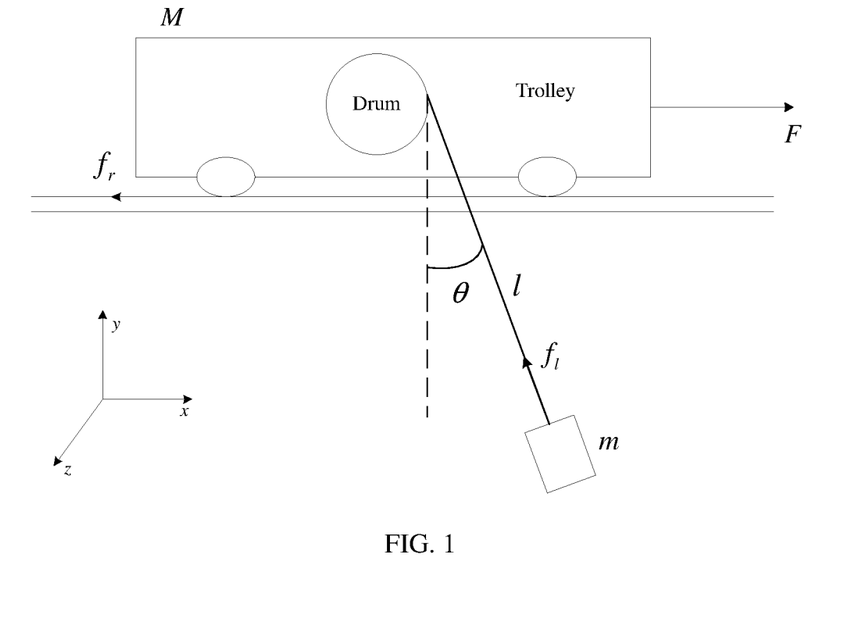
FIG. 1 is a schematic diagram of swinging of a crane.

In FIG. 1: M represents the mass of a trolley (unit: kg);
m represents the mass of hoisted goods (unit: kg);
x represents a displacement of the trolley (unit: m);
l represents the length of a steel rope (unit: m);
F represents the traction on the trolley (unit: N);
$f_r$ represents the friction on the trolley (unit: N);
$f_l$ represents the tension on the steel wire rope (unit: N);
θ represents a swinging angle of the load, i.e. a first-grade swinging angle (unit: rad); and
g represents the gravitational acceleration (unit: n/kg).

Step 1: a two-dimensional dynamic model of a bridge crane is constructed according to a Lagrange's equation:

$$\begin{cases} (M+m)\ddot{x} + mL\ddot{\theta}\cos\theta - mL\dot{\theta}^2\sin\theta_1 + f_r = F \\ l^2\ddot{\theta} + \cos\theta\ddot{x} + gL\sin\theta = 0 \end{cases} \quad (1\text{-}1)$$

therefore, the dynamic model of the crane is:

$$\begin{cases} \ddot{x} = \dfrac{F - mg\sin\theta\cos\theta - ml\dot{\theta}^2\sin\theta - \mu\dot{x}}{M + m\sin^2\theta} \\ \ddot{\theta} = \dfrac{F - mg\sin\theta\cos^2\theta - ml\dot{\theta}\sin\theta\cos\theta}{(M + m\sin^2\theta)l} \\ \quad - \dfrac{Mg\sin\theta + mg\sin^3\theta}{(M + m\sin^2\theta)l} \end{cases} \quad (1\text{-}2)$$

if the output torque of a motor is represented by $T_m$, according to an equation of $T_m = F \cdot r_1$, the following equation is obtained:

$$F = \frac{T_m}{r_1} \quad (1\text{-}3)$$

where $r_1$ represents a radius of a motor shaft.

Therefore, the size of the traction on the trolley may be controlled by the output torque of the motor.

The output torque is reflected by a current, so the output torque can be controlled by the current.

Step 2: a steel wire rope-motor nonlinear resonance model is constructed to detect a harmonic, and the harmonic is eliminated by means of active filtering.

A power supply is connected, a rotation speed of the motor is controlled by a frequency converter, the rotation of the motor generates one torque, the trolley is driven forward by a gearbox, and the forward movement of the trolley will drive the load to move; an unsmooth mechanical arm, anti-swing control and external interference such as wind and wave make the heavy object resonate with the steel wire rope to generate a resonance signal which is transmitted to the motor shaft through the mechanical transmission and reflected on the operating torque of the motor.

Because the steel wire rope is in mechanical flexible hard connection with the motor, the torque on the steel wire rope is in one-to-one correspondence with the torque on the motor shaft, and when the resonance occurs on the steel wire rope, the resonance signal will be transmitted to the motor shaft via the trolley and the gearbox to make the motor shaft generate one resonance torque. If mechanical equipment such as the mechanical arm and the gear box are smooth, the resonance torque on the steel wire rope has a linear functional relationship with the resonance torque on the motor shaft; and however, because the trolley moves on the unsmooth mechanical arm, the gearbox cannot be completely smooth, and when the resonance torque on the steel wire rope is transmitted to the motor shaft, signal attenuation may exist, so the resonance torque on the motor shaft is not completely equal to the resonance torque on the steel wire rope, a non-linear functional relationship exists, and through derivation and calculation, an equation is a second-order differential equation:

$$T_{eh} = f(T_{Lh}) \quad (1\text{-}4)$$

where the resonance torque on the motor shaft is represented by $T_{eh}$, and the resonance torque on the steel wire rope is represented by $T_{Lh}$.

For a fixed crane system, the motor shaft and the steel wire rope are respectively provided with a torque sensor, and a functional relationship is approximately fitted through a large number of experimental data. However, the method is not universal, and the fitted function is not accurate. Therefore, the present disclosure derives the second-order differential equation by means of theoretical analysis and modeling, obtains its numerical solution, determines the nonlinear resonance torque of the steel wire rope in real time, reduces it to the resonance torque on the motor shaft, and then determines the size of a nonlinear resonance current on the motor shaft.

To facilitate the study on a resonance phenomenon in a main transmission system of the crane, the main transmission system may be simplified to a shafting system composed of a plurality of inertia elements and elastic elements, and then a dynamic model of the main transmission system of the crane is constructed.

Figure 2:
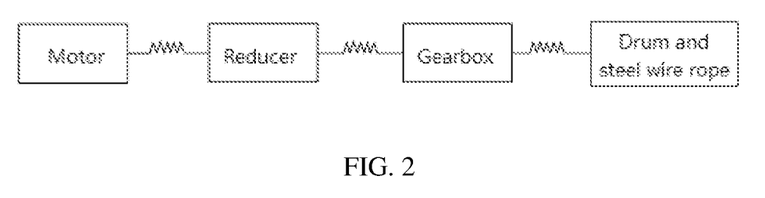
FIG. 2 is a schematic diagram of a four-mass spring system.

Simplification rules are as follows: in the main transmission system of the crane, an element with relatively large mass and relatively small elasticity is simplified as an inertia element by ignoring the elasticity; and an element with relatively large elasticity and relatively small mass is simplified as an elastic element by ignoring the mass. Through these rules, the main transmission system may be represented by a four-mass spring system, as shown in FIG. 2.

I. Motor-Drum Model

Figure 3:
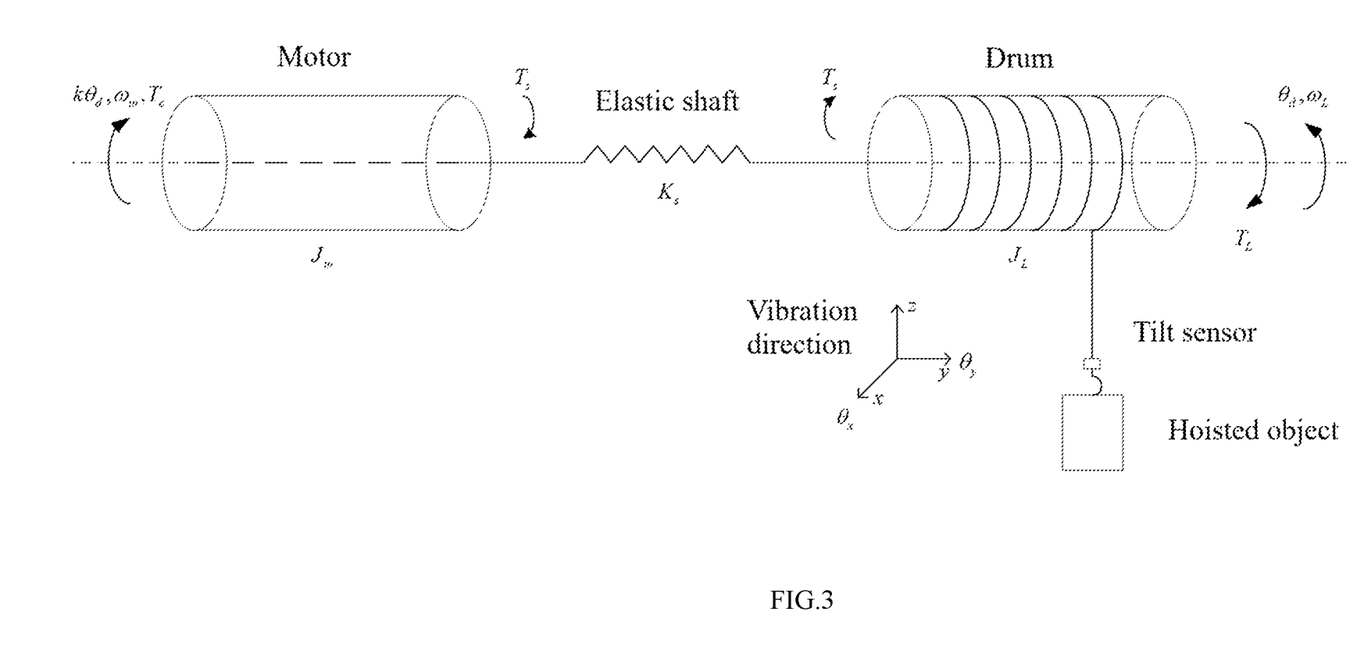
FIG. 3 is a schematic diagram of a two-mass system.

To facilitate the analysis and study, the main transmission system of the crane is further simplified to a two-mass system composed of an alternating current asynchronous motor and a drum which are connected via an elastic shaft, the damping of the connecting shaft is ignored, and the two-mass system is shown in FIG. 3:

$T_e$, $T_s$, and $T_L$ represent the electromagnetic torque of the motor, the torque of the connecting shaft, and the load torque of the drum (N·m), respectively;

$J_m$ and $J_L$ represent the rotational inertia of the motor and the rotational inertia of the drum (kg·m$^2$), respectively;

$\omega_m$ and $\omega_L$ represent an angular speed of the motor and an angular speed of the drum (rad/s), respectively;

$k\theta_d$ and $\theta_d$ represent a rotation angle of the motor and a rotation angle of the drum (k is a constant) (rad), respectively;

$\theta_x$ and $\theta_y$ represent swinging angles of the steel wire rope in x and y axis directions (rad), respectively; and $K_s$ represents a stiffness coefficient of the elastic shaft (N·m/rad).

Kinetic energy E and potential energy V of the two-mass system are as follows, respectively:

$$E = 1/2 J_m (k\dot\theta_d)^2 + 1/2 J_L \dot\theta_d^2 \qquad (1\text{-}5)$$

$$V = 1/2 K_s (K\theta_d - \theta_d) \qquad (1\text{-}6)$$

A Lagrange function L of the system is expressed as:

$$L = T - V \qquad (1\text{-}7)$$

System damping is ignored, and the generalized torque is defined as:

$$\begin{cases} F_1 = T_e \\ F_2 = T_L \end{cases} \qquad (1\text{-}9)$$

where i=1,2; j=1,2; $\theta_1 = k\theta_d$; $\theta_2 = \theta_d$, $q_j$ represents a generalized coordinate; $F_1$ and represents the generalized external torque.

In an ideal case (that is, without considering the resonance), the generalized external torque is defined as:

$$Q_i = \sum_{i=1}^{2} F_i \frac{\partial \theta_i}{q_j} \qquad (1\text{-}8)$$

According to the Lagrange theorem, a Lagrange equation of the system is as follows:

$$\frac{d}{dt}\left(\frac{\partial L}{\partial \dot\theta_i}\right) - \frac{\partial L}{\partial \theta_i} + \frac{\partial F}{\partial \theta_i} = Q_i \ (i=1,2) \qquad (1\text{-}10)$$

Equations (1-5) to (1-9) are substituted into equation (1-10), and an electromechanical coupling nonlinear dynamic equation of the main transmission system of the crane can be obtained:

$$\begin{cases} T_e - T_s = J_m k \ddot\theta_d \\ T_s = K_s(k\theta_d - \theta_d) \\ T_s - T_L = J_L \ddot\theta_d \end{cases} \qquad (1\text{-}11)$$

where $k\ddot\theta_d$ and $\ddot\theta_d$ represent the rotational angular acceleration of the motor and the rotational angular acceleration of the drum (rad/s$^2$), respectively.

Equation (1-11) is simplified to obtain the following equation:

$$T_e - T_L = J_m k \ddot\theta_d + J_L \ddot\theta_d \qquad (1\text{-}12)$$

However, in practice, the resonance torque generated by the resonance between the hoisted object and the steel wire rope cannot be ignored. The output torque of the motor is required to be $T_e$, but due to the resonance, the actual output of the motor is as follows:

$$T_{e\Sigma} = T_e + T_{eh} \qquad (1\text{-}13)$$

$T_{e\Sigma}$ represents the sum of the torque on the motor shaft. equation (1-13) still satisfies equation (1-12), then:

$$T_{e\Sigma} - T_{L\Sigma} = J_m k \ddot\theta_d + J_L \ddot\theta_d \qquad (1\text{-}14)$$

$T_{L\Sigma}$ represents the sum of the torque on the steel wire rope.

$$T_{L\Sigma} = T_L + T_{Lh} \qquad (1\text{-}15)$$

Therefore, to make the output torque of the motor still be $T_e$, the torque $T_{eh}$ generated by the resonance needs to be eliminated, and then the output torque of the motor after resonance elimination control is as follows:

$$T'_{e\Sigma} = T_{e\Sigma} - T_{eh} = T_e + T_{eh} - T_{eh} = T_e \qquad (1\text{-}16)$$

Because $T_L$ represents the load torque, in the process of hoisting the heavy object by the crane, the mass of the heavy object does not change, and $T_L$ does not change. However, the resonance torque $T_{Lh}$ will be affected by wind force, the unsmooth gear and other factors, so $T_{Lh}$ changes all the time, where:

$$T_{Lh} = m \cdot \bar\varphi(x,y,z) \cdot l_F \qquad (1\text{-}17)$$

where $\bar\varphi(x,y,z)$ represents the vibration acceleration (a second-order derivative of a vibration equation $\varphi(x,y,z)$ with respect to time) of the steel wire rope; $l_F$ represents an arm of force of the resonance torque on the steel wire rope; and m represents the mass of the steel wire rope.

Because a vibration in a z axis direction is small and can be ignored, and the sizes of the torque in the x axis direction and the y axis direction are substantially the same, a vibration equation $\varphi(x)$ in the x axis direction and a vibration equation $\varphi(y)$ in the y axis direction on the steel wire rope are the same.

Therefore, the resonance torque $T_{Lh}$ on the steel wire rope can be obtained only by knowing the vibration equation (i.e. the equation $\varphi(x)$) of the steel wire rope. The vibration equation of the steel wire rope will be derived below by analyzing a drum-steel wire rope model.

II. Drum-Steel Wire Rope Model

Figure 4:
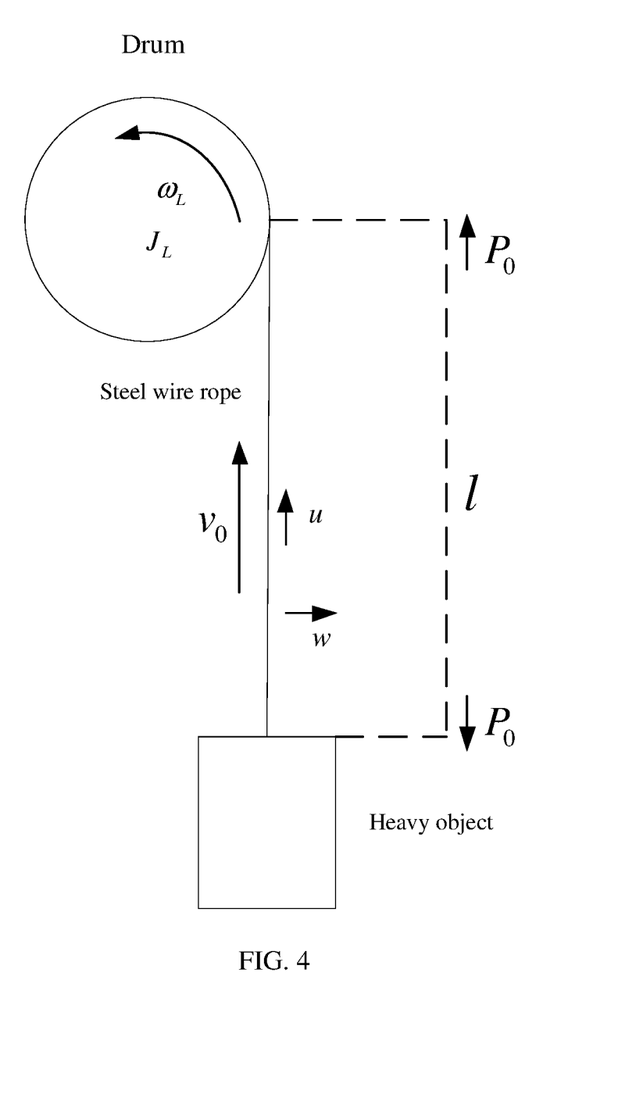
FIG. 4 is a schematic diagram of a drum-steel wire rope model.

As the steel wire rope is an elastic continuum, the steel wire rope can be considered as an isotropic uniform beam when studying the transverse and longitudinal motion of the steel wire rope, and vibrations of the steel wire rope are equivalent to transverse and longitudinal vibrations of a Euler beam. The drum is equivalent to a rigid inertia element, i.e. a fixed-axis rotating disk with the same width as the Euler beam. Therefore, the vibrations of the steel wire rope on the drum are equivalent to the transverse and longitudinal vibrations of the Euler beam moving axially under the inertial boundary conditions, and the drum-steel wire rope dynamic model is shown in the FIG. In the FIG, a longitudinal motion direction of the steel wire rope can be regarded as an axial motion direction of the Euler beam, if the steel wire rope moves at a constant speed, the tensions at upper and lower ends of the steel wire rope are represented by F1 and F2, respectively, it is assumed that $F_1=F_2=P_0$, $P_0$ represents a tension value, $\omega_L$ represents the angular speed of the drum, $J_L$ represents the rotational inertia of the drum, w and u represent displacement components of horizontal and vertical coordinates, respectively, and l represents the length of the Euler beam (the initial length thereof is represented by L), i.e. the length of the steel wire rope between the drum and the heavy object, as shown in FIG. 4.

1. Construction of Motion Equations

An equivalent dynamic model for the vibration of the steel wire rope in the process of hoisting the heavy object by the steel wire rope at an uniform speed is analyzed according to the Hamilton principle, a mathematical model is constructed, and kinetic energy $T_1$ of the Euler beam moving axially is as follows:

$$T_1 = \frac{1}{2}\int_0^L \rho A\left[\left(v_0 + \frac{du}{dt}\right)^2 + \left(\frac{dw}{dt}\right)^2\right] dl \quad (1\text{-}18)$$

$$= \frac{1}{2}\int_0^L \rho A\left[(v_0 + u_{,t} + v_0 u_{,l})^2 + (w_{,t} + v_0 w_{,l})^2\right] dl$$

where $\rho$ represents the density of the steel wire rope;
A represents a cross-sectional area of the Euler beam;
$v_0$ represents an axial motion speed of the Euler beam;
$w_{,t}$ represents a first-order partial derivative of a function w with respect to a variable t;
$w_{,l}$ represents a first-order partial derivative of the function w with respect to a variable l;
$u_{,t}$ represents a first-order partial derivative of a function u with respect to the variable t; and
$u_{,l}$ represents a first-order partial derivative of the function u with respect to the variable l;
by analogy, other same symbols indicate similar meanings.

Deformation potential energy $U_1$ of the Euler beam is as follows:

$$U_1 = \frac{1}{2}\iiint E\varepsilon_l^2 dx dy dz \quad (1\text{-}19)$$

$$= \frac{1}{2}\int_0^L \left[EA\left(u_{,l} + \frac{1}{2}w_{,l}^2\right)^2 + EIw_{,ll}^2\right] dl$$

where $\varepsilon_l$ represents the strain of the beam;
E represents an elasticity modulus;
I represents the inertia torque; and
$w_{,ll}$ represents a second-order partial derivative of the function w with respect to l.

Kinetic energy $T_2$ of the drum is as follows:

$$T_2 = \frac{1}{2}J_L\left(\frac{du}{dt}\frac{1}{r_2}\right)^2 = \frac{J_L}{2r_2^2}(u_{,t} + v_0 u_{,l})^2 \quad (1\text{-}20)$$

where $r_2$ represents a radius of the drum.

Potential energy $U_2$ generated by the tension $P_0$ acting in an l direction is as follows:

$$U_2 = \int_0^L P_0(ds - dl) = \int_0^L P_0\left(\sqrt{(dl+du)^2 + (dw)^2} - dl\right) \quad (1\text{-}21)$$

-continued $$= \int_0^L P_0\left(\sqrt{(dl+u_{,l}dl)^2 + (w_{,l}dl)^2} - dl\right)$$

$$= \int_0^L P_0\left(\sqrt{(1+u_{,l})^2 + (w_{,l}^2)^2} - 1\right) dl$$

where s represents an actual motion direction of the vibration of the steel wire rope.

The Taylor series expansion is used and higher order terms above the third order are omitted, and axial tension potential energy $U_2$ of the Euler beam is as follows:

$$U_2 = \int_0^L P_0(u_{,l} + 1/2 w_{,l}^2) dl \quad (1\text{-}22)$$

According to the Hamilton variational principle:

$$\delta\int_{t_2}^{t_1}(T_1+T_2-U_1-U_2)dt = 0 \quad (1\text{-}23)$$

where $t_1, t_2$ represent the starting and ending time of motion.

The motion equations of the Euler beam can be derived:

$$\rho A u_{,tt} + (\rho A v_0^2 - EA)u_{,ll} + 2\rho A v_0 u_{,lt} - EA w_{,l}w_{,ll} = 0 \quad (1\text{-}24)$$

$$\rho A w_{,tt} + EI w_{,llll} + (\rho A v_0^2 - P_0)w_{,ll} + 2\rho A v_0 w_{,lt} - EA(w_{,l}u_{,lt}+u_{,l}w_{,ll}+3/2 w_{,l}^2 w_{,ll}) = 0 \quad (1\text{-}25)$$

where $u_{,ll}$ represents a second-order partial derivative of the function u with respect to l; and
$w_{,llll}$ represents a fourth-order partial derivative of the function w with respect to l.

Because the axial strain torque of the Euler beam is equal to the inertia torque of the fixed-axis rotating drum rotating, the boundary conditions are as follows:

$$\text{when } l=0,\ EAr_2 u_{,l} - P_0 r_2 = -J_L \frac{d^2u}{dt^2}\frac{1}{r_2} \quad (1\text{-}26)$$

$$\text{when } l=L,\ P_0 r_2 + EAr_2 u_{,l} = -J_L \frac{d^2u}{dt^2}\frac{1}{r_2} \quad (1\text{-}27)$$

$$w(0) - w(L) = w_{,ll}(0) = w_{,ll}(L) = 0 \quad (1\text{-}28)$$

$$w_{max} = \varphi_m \quad (1\text{-}29)$$

where $w(0)$ represents a vibration displacement of the steel wire rope when l=0.
$w(L)$ represents a vibration displacement of the steel wire rope when l=L;
$w_{,ll}(0)$ represents a second-order partial derivative of the vibration displacement of the steel wire rope when l=0 with respect to l;
$w_{,ll}(L)$ represents a second-order partial derivative of the vibration displacement of the steel wire rope when l=L with respect to l;
$w_{max}$ represents the maximum displacement of the steel wire rope in the x axis direction; and
$\varphi_m$ represents the maximum amplitude of the steel wire rope.

Usually, the kinetic energy of the axial motion caused by the vibration of the steel wire rope is relatively small, so $u_{,t}=u_{,tt}=0$ is satisfied, and equation (1-24) can be simplified to:

$$(\rho A v_0^2 - EA)u_{,ll} - EA w_{,l}w_{,ll} = 0 \quad (1\text{-}30)$$

2. Simplification of the Motion Equations

A time variable and a space variable in the motion equations derived above are coupled. To separate the time variable and the space variable in the motion equations and eliminate the time variable, it is assumed that a time function is a harmonic function, and a Kantorovich time averaging method is used to obtain a dynamic nonlinear equation with only the space variable.

$w = \bar{\varphi}(l)\cos \bar{\omega} t$ is satisfied and is substituted into equation (1-30) to obtain the following equation:

$$u = \bar{\phi}(l)\cos^2 \bar{\omega} t \quad (1\text{-}31)$$

where $\bar{\varphi}(l)$ represents a vibration amplitude of the steel wire rope; and $\bar{\omega}$ represents a vibration frequency of the steel wire rope;

the determined u and w are respectively substituted into equation (1-25), and the equation is transformed into:

$$R = -\omega^2 \rho A \bar{\varphi} \cos \bar{\omega} t + EI\bar{\varphi}_{,llll} \cos \bar{\omega} t - 3/2 EA\bar{\varphi}_{,l}{}^2\bar{\varphi}_{,ll} \cos^3 \bar{\omega} t - 2\rho A v_0 \bar{\varphi}_{,l} \sin \bar{\omega} t - EA(\bar{\varphi}_{,ll}\bar{\phi}_{,l} + \bar{\varphi}_{,l}\bar{\phi}_{,ll})\cos^3 \bar{\omega} t + (\rho A v_0{}^2 - P_0)\bar{\varphi}_{,ll} \cos \bar{\omega} t \neq 0 \quad (1\text{-}32)$$

where $\bar{\varphi}_{,l}$ represents a first-order partial derivative of $\bar{\varphi}$ with respect to l;

$\bar{\varphi}_{,ll}$ represents a second-order partial derivative of $\bar{\varphi}$ with respect to l;

$\bar{\varphi}_{,llll}$ represents a fourth-order partial derivative of $\bar{\varphi}$ with respect to l;

$\bar{\phi}_{,l}$ represents a first-order partial derivative of $\bar{\phi}$ with respect to l; and $\bar{\phi}_{,ll}$ represents a second-order partial derivative of $\bar{\phi}$ with respect to l;

The Kantorovich time averaging method is applied to an interval of $[0, 2\pi/\bar{\omega}]$.

$$\int_0^{\frac{2\pi}{\bar{\omega}}} R \cdot \cos \bar{\omega} t \, dt = 0 \quad (1\text{-}33)$$

that is $$EI\bar{\varphi}_{,llll} + (\rho A v_0{}^2 - P_0)\bar{\varphi}_{,ll} - \omega_0{}^2 \rho A \bar{\varphi} - 3/4 EA(\bar{\varphi}_{,ll}\bar{\phi}_{,l} + \bar{\varphi}_{,l}\bar{\phi}_{,ll} + 3/2\bar{\varphi}_{,l}{}^2\bar{\varphi}_{,ll}) = 0 \quad (1\text{-}34)$$

Similarly, u and w are respectively substituted into equations (1-26) to (1-29), and according to an equation of $$\int_0^{\frac{2\pi}{\bar{\omega}}} R \cdot \cos^2 \bar{\omega} t \, dt = 0,$$

the boundary conditions are simplified to:

when $l = 0$, $J_L v_0^2 \bar{\phi}_{,ll} + EAr_2^2 \bar{\phi}_{,l} - \frac{4}{3} J_L \omega_L^2 \bar{\phi} - \frac{4}{3} P_0 r_2^2 = 0$ (1-35)

when $l = L$, $J_L v_0^2 \bar{\phi}_{,ll} + EAr_2^2 \bar{\phi}_{,l} - \frac{4}{3} J_L \omega_L^2 \bar{\phi} + \frac{4}{3} P_0 r_2^2 = 0$ (1-36)

$\bar{\varphi}(0) = \bar{\varphi}(L) = \bar{\varphi}_{,ll}(0) = \bar{\varphi}_{,ll}(L) = 0$ (1-37)

$\bar{\varphi}\left(\frac{L}{2}\right) = \bar{\varphi}_m$ (1-38)

where $\bar{\varphi}(0)$ represents a vibration amplitude of the steel wire rope when l=0;

$\bar{\varphi}(L)$ represents a vibration amplitude of the steel wire rope when l=L;

$\bar{\varphi}_{,ll}(0)$ represents a second-order partial derivative of the vibration amplitude of the steel wire rope when l=0 with respect to l;

$\bar{\varphi}_{,ll}(L)$ represents a second-order partial derivative of the vibration amplitude of the steel wire rope when l=L with respect to l;

$\bar{\varphi}\left(\frac{L}{2}\right)$ represents a vibration amplitude of the steel wire rope when $l = \frac{L}{2};$ and $\bar{\varphi}_m$ represents the maximum vibration amplitude of the steel wire rope.

To simplify the following calculation, dimensionless quantities are introduced:

$$l = \frac{l}{L}, \phi = \frac{\bar{\phi}}{L}, \varphi = \frac{\bar{\varphi}}{L}, v = v_0 \sqrt{\frac{\rho}{E}},$$

$$\bar{\omega} = \omega_L \sqrt{\frac{\rho A L^4}{EI}}, S = \frac{AL^2}{I}, J = \frac{J_L}{\rho A r_2^2 L}, P = \frac{P_0 L^2}{EI}$$

The above equations are substituted into equations (1-30) and (1-34) and the boundary conditions (1-35) to (1-38) for nondimensionalization, and the motion equations of the Euler beam are sorted as follows:

$$(v^2-1)\phi_{,ll} - \varphi_{,l}\varphi_{,ll} = 0 \quad (1\text{-}39)$$

$$\varphi_{,llll} + (Sv^2 - P)\varphi_{,ll} - \bar{\omega}^2 \varphi - 3/4 S(\varphi_{,ll}\phi_{,l} + \varphi_{,l}\phi_{,ll} + 3/2\varphi_{,l}{}^2\varphi_{,ll}) = 0 \quad (1\text{-}40)$$

where $\varphi_{,l}$ represents the first-order partial derivative of $\varphi$ with respect to l;

$\varphi_{,ll}$ represents the second-order partial derivative of $\varphi$ with respect to l;

$\varphi_{,llll}$ represents the fourth-order partial derivative of $\varphi$ with respect to l;

$\phi_{,l}$ represents the first-order partial derivative of $\phi$ with respect to l; and $\phi_{,ll}$ represents the second-order partial derivative of $\phi$ with respect to l;

the boundary conditions are as follows:

when $l = 0$, $Jv^2\phi_{,ll} + \phi_{,l} - \frac{4J}{3S}\omega^2\phi - \frac{4P}{3S} = 0$ (1-41)

when $l = L$, $Jv^2\phi_{,ll} + \phi_{,l} - \frac{4J}{3S}\omega^2\phi + \frac{4P}{3S} = 0$ (1-42)

$\varphi(0) = \varphi(1) = \varphi_{,ll}(0) = \varphi_{,ll}(1) = 0$ (1-43)

$\varphi\left(\frac{1}{2}\right) = \varphi_m$ (1-44)

where $\varphi(0)$ represents the vibration amplitude of the steel wire rope when l=0;

$\varphi(1)$ represents the vibration amplitude of the steel wire rope when l=1;

$\varphi_{,ll}(0)$ represents the second-order partial derivative of the vibration amplitude of the steel wire rope when l=0 with respect to l;

$\varphi_{,ll}(1)$ represents the second-order partial derivative of the vibration amplitude of the steel wire rope when l=1 with respect to l;

$\varphi(1/2)$ represents the vibration amplitude of the steel wire rope when l=1/2; and $\varphi_m$ represents a maximum vibration amplitude of the steel wire rope.

3. Analytical Solutions of the Motion Equations

First, all non-linear terms in equation (1-40) are moved to the right side of the equation and are omitted, and then equation (1-40) can be transformed into:

$$\varphi_{,llll} - \overline{\omega}^2 \varphi = 0 \tag{1-45}$$

A series expansion solution of equation (1-45) when x=0 is determined:

$$\varphi = a_0 M_0(x) + a_1 N_0(x) + a_2 I_0(x) + a_3 K_0(x) \tag{1-46}$$

where $$\begin{cases} M_0 = \sum_{n=0}^{\infty} \frac{(\overline{\omega}^2)^n}{(4n)!} x^{4n} \\ N_0 = \sum_{n=0}^{\infty} \frac{(\overline{\omega}^2)^n}{(4n+1)!} x^{4n+1} \\ I_0 = \sum_{n=0}^{\infty} \frac{(\overline{\omega}^2)^n}{(4n+2)!} x^{4n+2} \\ K_0 = \sum_{n=0}^{\infty} \frac{(\overline{\omega}^2)^n}{(4n+3)!} x^{4n+3} \end{cases} \tag{1-47}$$

Then, $\varphi(x)$ is substituted into the boundary conditions (1-43) and (1-44) to determine coefficients:

$$a_0 = 0, \quad a_1 = \mu_1 \varphi_m, \quad a_2 = 0, \quad a_3 = \mu_2 \varphi_m$$

where $\mu_1 = \dfrac{-K_0(1)}{N_0(1)K_0\left(\frac{1}{2}\right) - N_0\left(\frac{1}{2}\right)K_0(1)}, \mu_2 = \dfrac{N_0(1)}{N_0(1)K_0\left(\frac{1}{2}\right) - N_0\left(\frac{1}{2}\right)K_0(1)}$.

So that the following equation is obtained:

$$\varphi(x) = \varphi_m[\mu_1 N_0(x) + \mu_2 K_0(x)] = \tag{1-48}$$

$$\varphi_m\left[\mu_1 \sum_{n=0}^{\infty} \frac{\overline{\omega}^{2n} x^{4n+1}}{(4n+1)!} + \mu_2 \sum_{n=0}^{\infty} \frac{\overline{\omega}^{2n} x^{4n+3}}{(4n+3)!}\right] k(l) =$$

$$\left[\mu_1 \sum_{n=0}^{\infty} \frac{\overline{\omega}^{2n}(l/l(k))^{4n+1}}{(4n+1)!} + \mu_2 \sum_{n=0}^{\infty} \frac{\overline{\omega}^{2n}(l/l(k))^{4n+3}}{(4n+3)!}\right]$$

is satisfied, and then an amplitude at a position l satisfies $\varphi(l) = \varphi_m \cdot k(l)$.

Swinging angles in the x and y axis directions are measured by a tilt sensor and are subject to Fourier transformation to calculate $\overline{\omega}$.

Because $\varphi(l_0) = (l(k) - l_0) \cdot \theta_{max}$, where $l_0$ represents a distance from the tilt sensor to a main hook;

$\varphi(l_0)$ represents a vibration amplitude at a position $l_0$; and $\theta_{max}$ represents the maximum $\theta_x$ or $\theta_y$ measured by the tilt sensor.

$D_k = \varphi_m \cdot (-\overline{\omega}^2 \cos \overline{\omega} t) \cdot \rho A$ is satisfied.

Based on above, a steel wire rope-motor shaft nonlinear resonance torque model can be obtained:

$$T_{eh} = \int_0^{l(k)} \rho A \cdot \ddot{w} \cdot (l(k) - l) dl + T_L - T_e + J_m k \ddot{\theta}_d + J_L \ddot{\theta}_d \tag{1-49}$$

$$= \int_0^{l(k)} (l(k) - l) \cdot D(k) \cdot k(l) dl + T_L - T_e + J_m k \ddot{\theta}_d + J_L \ddot{\theta}_d$$

$T_{eh}$ represents the torque size of the nonlinear resonance torque on the steel wire rope transmitted to the motor shaft.

The length l(k) of the rope and the rotation angle $\theta_d(k)$ of the drum in the process of hoisting the heavy object can be measured by an absolute value encoding disc; the swinging angles $\theta_x(k)$ and $\theta_y(k)$ of the steel wire rope can be measured by the tilt sensor, and then the vibration frequency $\overline{\omega}$ of the steel wire rope is measured.

III. Resonance Current Elimination by Means of Active Filtering

The relationship between the resonance torque on the steel wire rope and the resonance torque on the motor shaft has been derived above, and the resonance torque on the steel wire rope can be eliminated by eliminating the resonance torque on the motor shaft, while the torque actually output by the motor is reflected by a current:

$$T_{e\Sigma} = C_m \phi i_\Sigma = C_m \phi(i_T + i_h) \tag{1-50}$$

where $i_T$ represents an armature torque current, $i_h$ represents a harmonic current generated by the resonance, $C_m$ represents a torque coefficient, and $\phi$ represents the magnetic flux.

The harmonic current generated by the resonance on the steel wire rope will be added to an operating torque current of the motor, and the measured resonance torque on the wire rope is fed back to the system through the resonance current $i_{Lh}$ by using the continuity and immutability characteristics of the current.

How to eliminate the resonance on the steel wire rope? When the heavy object resonates with the steel wire rope, a resonance signal is generated, which is regarded as an external interference. The interference signal can be completely reproduced only by knowing the phase and amplitude of the interference signal, and a desired signal component is obtained by deducting the interference signal from an original signal. Therefore, the resonance current generated on the motor shaft due to the resonance on the steel wire rope can be counteracted by generating a current with a size equal to and a phase opposite to the resonance current on the motor shaft, thereby eliminating the resonance on the motor shaft and further eliminating the resonance on the steel wire rope. The method is called active filtering.

By measuring a current resonance current $i_h(k)$ on the motor shaft and because of the continuity, immutability and derivability of the current, a resonance current $i_h(k+1)$ on the motor shaft in the next sampling period can be estimated:

$$i_h(k+1) = i_h(k) + T \frac{di_h(k)}{dt} \tag{1-51}$$

where T represents a sampling period of the motion control of the motor.

The operation of the trolley is controlled by a vector which is adjusted according to the constant magnetic flux, and a magnetic flux current is constant and does not change, so that the resonance elimination and anti-swing purpose can be achieved by adding a current with a size equal to and a direction opposite to the resonance current to the armature current $i_T$:

$$i'_T(k+1)=i_T(k+1)+[-i_h(k+1)] \quad (1\text{-}52)$$

where $i_T(k+1)$ represents an armature current on the motor shaft in the next period without control; and $i'_T(k+1)$ represents an armature current on the motor shaft in the next period with control.

For the convenience of control, a three-phase current output from the motor needs to be converted into direct-axis and quadrature-axis currents, and a two-phase rotating current also needs to be converted into a three-phase current capable of controlling PWM through vector transformation, so the vector transformation is needed.

The vector transformation control is based on coordinate transformation according to the following three principles:

1. Magnetomotive forces generated at different coordinates are the same;
2. Power does not change before and after transformation; and
3. A current transformation matrix and a voltage transformation matrix are unified.

(1) CLARK Transformation

Figure 5:
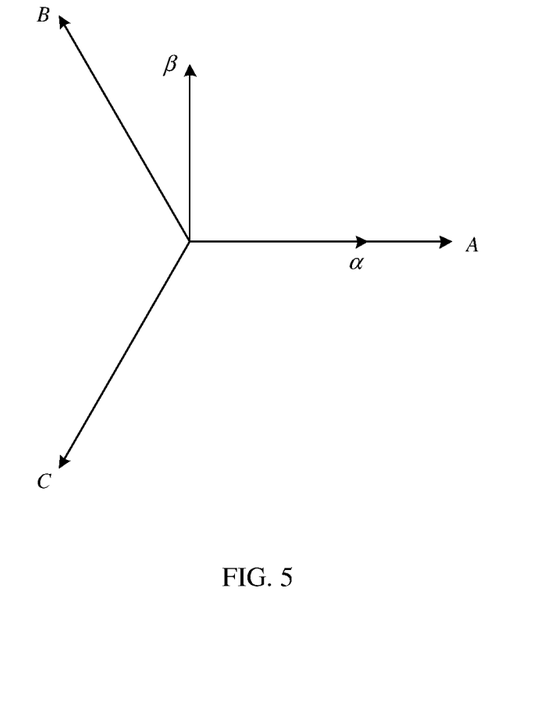
FIG. 5 is a schematic diagram of a CLARK transformation.

The transformation between a three-phase static winding A-B-C and a two-phase static winding α-β, or the transformation between a three-phase static coordinate system and a two-phase static coordinate system, is called CLARK transformation, which is called 3/2 transformation for short, as shown in FIG. 5.

The α axis is coincided with the A axis, and instantaneous magnetomotive forces of the two sets of windings in the α axis and β axis are equal.

A matrix is written as follows:

$$\begin{bmatrix} i_\alpha \\ i_\beta \end{bmatrix} = \sqrt{\frac{2}{3}} \begin{bmatrix} 1 & -\frac{1}{2} & -\frac{1}{2} \\ 0 & -\frac{\sqrt{3}}{2} & \frac{\sqrt{3}}{2} \end{bmatrix} \begin{bmatrix} i_a \\ i_b \\ i_c \end{bmatrix} \quad (1\text{-}53)$$

where $i_\alpha, i_\beta$ represent currents in the two-phase static coordinate system: and $i_a, i_b, i_c$ represent currents in the three-phase static coordinate system.

The inverse transformation of the matrix is as follows:

$$\begin{bmatrix} i_a \\ i_b \\ i_c \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_\alpha \\ i_\beta \end{bmatrix} \quad (1\text{-}54)$$

(2) PARK Transformation

The transformation from the two-phase static coordinate system α-β to a two-phase rotating coordinate system d-q is called two-phase rotation transformation or PARK transformation, which is called $C_{2r/2s}$ transformation for short, where s represents a stationary state and r represents rotation.

Figure 6:
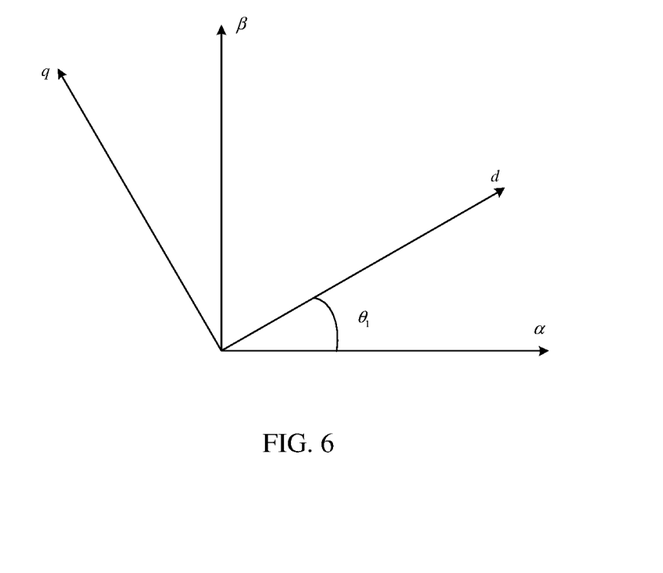
FIG. 6 is a schematic diagram of a PARK transformation.

The two coordinate systems are drawn together to obtain FIG. 6.

It can be seen from the FIG. that relationships between $i_\alpha$, $i_\beta$, $i_d$, and $i_q$ are as follows:

$$\begin{cases} i_\alpha = i_d\cos\theta_1 - i_q\sin\theta_1 \\ i_\beta = i_d\sin\theta_1 - i_q\cos\theta_1 \end{cases} \quad (1\text{-}55)$$

where $i_d, i_q$ represent currents in the two-phase rotating coordinate system; and $\theta_l$ represents an included angle between the d, α axes.

A matrix is written as follows:

$$\begin{bmatrix} i_\alpha \\ i_\beta \end{bmatrix} = \begin{bmatrix} \cos\theta_1 & -\sin\theta_1 \\ \sin\theta_1 & \cos\theta_1 \end{bmatrix} \begin{bmatrix} i_d \\ i_q \end{bmatrix} = C_{2r/2s} \begin{bmatrix} i_d \\ i_q \end{bmatrix} \quad (1\text{-}56)$$

where:

$$C_{2r/2s} = \begin{bmatrix} \cos\theta_1 & -\sin\theta_l \\ \sin\theta_1 & \cos\theta_1 \end{bmatrix} \quad (1\text{-}57)$$

The inverse transformation is as follows:

$$C_{2s/2r} = \begin{bmatrix} \cos\theta_1 & \sin\theta_l \\ -\sin\theta_1 & \cos\theta_1 \end{bmatrix} \quad (1\text{-}58)$$

In step 2, the steel wire rope-motor shaft nonlinear resonance torque model is derived, and the resonance torque and resonance current on the motor shaft are derived through the model. Meanwhile, how to use the current to control the output torque of the motor to further control the crane model in step 1 so as to quickly achieve the anti-swing and resonance elimination effect is introduced in details, and step 3 is a specific description of a design method of resonance elimination control.

Step 3: resonance elimination control is designed based on an active filtering technology.

Figure 7:
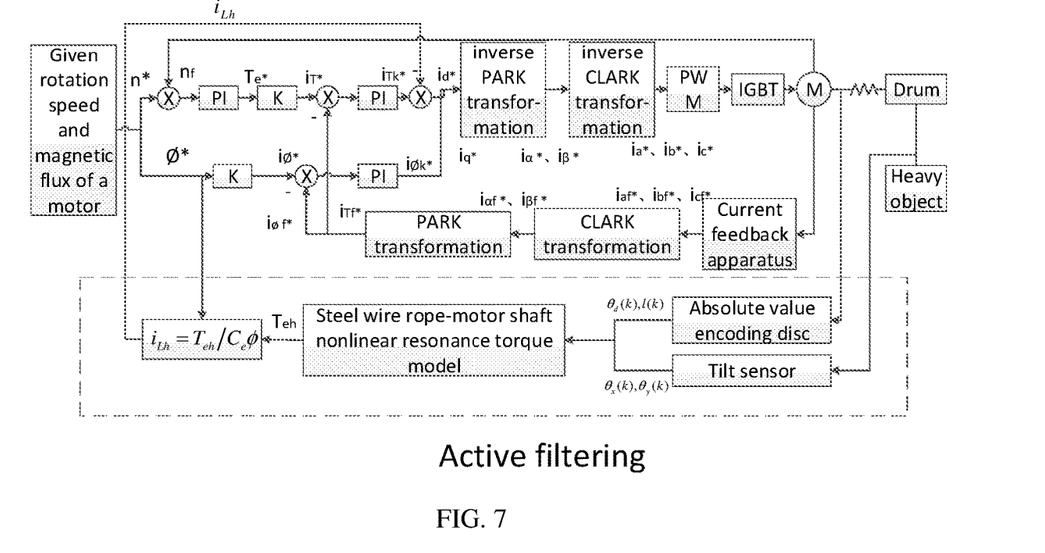
FIG. 7 is a schematic diagram of a resonance elimination control system of an active filtering technology.

A principle of the system is shown in FIG. 7.

In the FIG, n* represents a per-unit value of a given rotation speed, $n_f$ represents a per-unit value of a feedback rotation speed, $T_e^*$ represents a per-unit value of the armature torque, $i_T^*$ represents a per-unit value of an armature current, $\phi^*$ represents a per-unit value of the magnetic flux, $i_\phi^*$ represents a per-unit value of a magnetic flux current, $T_f$ represents the feedback torque, and it represents a feedback current.

When a rotation speed n of the motor is given, the magnetic flux $\phi$ is also determined according to following equation:

$$\phi = \frac{E}{4.44 * f * n} \quad (1\text{-}59)$$

where f represents a supply frequency; and
E represents an electromotive force of a coil.

A relationship between the armature current $i_T$ and the armature torque $T_e$ is as follows:

$$T_e = C_e \phi i_T \quad (1\text{-}60)$$

where $C_e$ represents a constant of the electromagnetic torque.

A relationship between the magnetic flux current $i_\phi$ is and the rotation speed n is as follows:

$$E = C_e n i_\phi \quad (1\text{-}61)$$

It can be seen from FIG. 7 that a rotation speed is given, which has a rotation speed difference with an actual rotation speed of the motor; the armature torque is output after the rotation speed passes through a PI regulator; the direct-axis current $i_d$ is obtained by deducting the fed back harmonic current from the armature current, and the magnetic flux current is the quadrature-axis current $i_q$. $i_d$ and $i_q$ can be converted into two-phase static currents $i_\alpha$ and $i_\beta$ through inverse PARK transformation, and then converted into three-phase static currents $i_a$, $i_b$, and $i_c$ through inverse CLARK transformation. The turn-on and turn-off of IGBT are controlled through PWM, and then the rotation speed of the motor is controlled. The motor will also feed an actual output rotation speed back to the system through current feedback, so that the output rotation speed is close to a target rotation speed. The absolute value encoding disc mounted on the motor shaft can measure the length of the steel wire rope and the rotation angle of the motor shaft, and the tilt sensor mounted on the end of the steel wire rope can measure the swinging angle, and then the swinging displacement and the resonance torque on the motor shaft are determined. A current with a size equal to and a direction opposite to the resonance current is generated by an active filtering apparatus, and the resonance on the steel wire rope is eliminated by the method of step 2.

The basic principles and main features of the present disclosure as well as the advantages of the present disclosure are described above. Those skilled in the art should understand that the present disclosure is not limited to the above embodiments, the above embodiments and the description are merely used to explain the principles of the present disclosure, various changes and improvements may further be made to the present disclosure without departing from the spirit and scope of the present disclosure, and all of these changes and improvements shall fall within the scope of protection of the present disclosure. Therefore, the scope of protection of the present disclosure shall be defined by the appended claims and equivalents thereof.

What is claimed is:

1. A harmonic elimination control method of a crane steel rope based on an active filtering technology, wherein the harmonic elimination control method of the crane steel rope based on the active filtering technology comprises the steps of:

establishing a dynamic model of a two-dimensional bridge crane according to a Lagrange equation; controlling an output torque of a motor by a current and controlling traction force of a trolley by the output torque of the motor;

detecting harmonic waves and performing harmonic elimination by using the active filtering technology; and establishing the dynamic model of the two-dimensional bridge crane according to the Lagrange equation:

$$\begin{cases} (M+m)\ddot{x} + ml\cos\theta - ml\dot{\theta}^2\sin\theta_1 + f_r = F \\ l^2\ddot{\theta} + \cos l\theta\ddot{x} + gl\sin\theta = 0 \end{cases}$$

the dynamic model of the crane is $$\begin{cases} \ddot{x} = \dfrac{F - mg\sin\theta\cos\theta - ml\dot{\theta}^2\sin\theta - f_r}{M + m\sin^2\theta} \\ \ddot{\theta} = \dfrac{F - mg\sin\theta\cos^2\theta - ml\dot{\theta}\sin\theta\cos\theta}{(M + m\sin^2\theta)l} - \dfrac{Mg\sin\theta + mg\sin^3\theta}{(M + m\sin^2\theta)l} \end{cases}$$

assuming that the output torque of the motor is $T_m$, according to a formula $T_m = F*r$, so:

$$F = \frac{T_m}{r}$$

where r is the radius of a motor shaft;

a method for harmonic detection by using the active filtering technology comprises the steps of:

connecting a power supply; controlling a rotation speed of the motor through a frequency converter, thereby generating a torque by rotation of the motor; driving the trolley to move forward through a gear box, thereby driving load movement and making a heavy object resonate with a steel wire rope to generate a resonance signal which is transmitted to the motor shaft through mechanical transmission and reflected on a running torque of the motor, wherein there is a one-to-one correspondence between the torque on the steel wire rope and the torque on the motor shaft when the steel wire rope resonates, the resonance signal will be transmitted to the motor shaft through the trolley and the gear box, so that the motor shaft generates a resonance torque; assuming that mechanical equipment such as a mechanical arm and the gear box are smooth, the resonance torque on the steel wire rope and the resonance torque on the motor shaft have a linear function relation, but the gear box is not completely even because the trolley moves on the unsmooth mechanical arm; therefore, when the resonance torque on the steel wire rope is transmitted to the motor shaft, there is signal attenuation, which makes the resonance torque on the motor shaft not completely equal to the resonance torque on the steel wire rope; there is a nonlinear function relation:

$$T_{zh} = f(T_{eh}) \tag{4}$$

where the resonance torque on the motor shaft is $T_{eh}$; and the resonance torque on the steel wire rope is $T_{zh}$;

for a fixed crane system, torque sensors are installed on the motor shaft and the steel wire rope respectively; and the function relation is fitted by experimental data;

under the condition that the crane system does not generate resonance, the torque generated by a given motor speed is $T_e$; and the driven load torque is $T_z$, so:

$$T_e - T_z = J\frac{dn}{dt}$$

where: j is a rotation inertia; and n is the motor speed;

under actual circumstances, a resonance torque generated by resonance between a hung object and the steel wire rope requires an output torque of the motor to be $T_e$; and existence of the resonance makes actual output of the motor as follows:

$$T_{e\Sigma} = T_e + T_{eh}, \text{ so:}$$

$$T_{e\Sigma} - T_{z\Sigma} = J\frac{dn}{dt}$$

where the output torque of the motor is still $T_e$; and the torque $T_{eh}$ generated by resonance is eliminated, so that the output torque of the motor after harmonic elimination control is $$T_{e\Sigma}=T_{e\Sigma}-T_{eh}=T_e+T_{eh}-T_{eh}=T_e$$

the actual output torque of the motor is reflected by a current:

$$T_{e\Sigma}=C_m\phi i_\Sigma=C_m\Phi(i_T+i_h)$$

where $i_T$ is an armature torque current; $i_h$ is a harmonic current generated by resonance; and $C_m$ is a torque coefficient;

the harmonic current generated by resonance will be superimposed on a running torque current of the motor; and a total torque output by the motor will be fed back to the system through the current $i_\Sigma$ by using a characteristic that the current is continuous and non-mutational, where:

$$i_\Sigma=i_T+i_h$$

the total torque on the steel wire rope is obtained by measuring the total torque on the motor shaft and the resonance on the motor shaft and the resonance on the steel wire rope are eliminate& the method for harmonic detection by using the active filtering technology further comprises:

generating a sine signal sinwt and a cosine signal -coswt, which are in a same phase with an a-phase grid voltage $u_a$ and are generated by a phase-locked loop and a sine and cosine signal generating circuit transforming motor currents $i_a$, $i_b$ and $i_c$ by CLARK transformation and PARK transformation to obtain $i_d$ and $i_q$; then obtaining DC components $\bar{i}_d$ and $\bar{i}_q$ of $i_d$ and $i_q$ through LPF filtering; then transforming $\bar{i}_d$ and $\bar{i}_q$ by CLARK inverse transformation and PARK inverse transformation to obtain fundamental wave components $i_a$, $i_b$ and $i_c$; and then obtaining harmonic components $i_{ah}$, $i_{bh}$ and $i_{ch}$ of $i_a$, $i_b$ and $i_c$ by subtracting $i_a$, $i_b$ and $i_c$ and $i_a$, $i_b$ and $i_c$;

by measuring a resonance current $i_h(k)$ on the current motor shaft, estimating a resonance current $i_h(k+1)$ on the motor shaft in a next sampling period because the current is continuous, non-mutational and inducible:

$$i_h(k+1) = i_h(k) + T\frac{di_h(k)}{dt}$$

where T is the sampling period of motor motion control;

when the trolley runs, vector control is adopted; and a flux current is constant by constant flux adjustment therefore, an armature current $i_T$ is added with a current which has a same magnitude and an opposite direction as the resonance current, so as to achieve a purpose of harmonic elimination and swing prevention:

$$i'_T(k+1)=i_T(k+1)+[-i_h(k+1)]$$

a three-phase current output by the motor is converted into direct-axis and cross-axis currents; and a two-phase rotating current is converted into a three-phase current for PWM control by vector transformation, which needs vector transformation;

the harmonic elimination control based on the active filtering technology comprises:

when the rotation speed n of a motor is given, a magnetic flux $\Phi$ is also determined, so:

$$\Phi = \frac{E}{4.44f*n*k}$$

a relationship between the armature current $i_T$ and the armature torque $T_e$ is $$T_e=C_e\Phi i_T$$

a relationship between the magnetic flux current $I_\Phi$ and the rotation speed n is $$E=C_e n i_\Phi$$

given a rotation speed n* and a magnetic flux $\Phi$*, the given rotation speed n* has a rotation speed difference with an actual feedback rotation speed $o_f$ of the motor; an armature torque $T_e$* is output after passing through a PI regulator; an armature current $i_T$* is calculated; the armature current minus the feedback harmonic current is the cross-axis current $i_q$; the magnetic flux current is the direct-axis current $i_d$; $i_d$ and $i_q$ can be converted into two-phase static currents $i_\alpha$ and $i_\beta$ by PARK inverse transformation; then, through CLARK inverse transformation, the currents are transformed into three-phase static currents $i_a$, $i_b$ and $i_c$; PWM controls switching-on and switching-off of IGBT, thereby controlling the rotation speed of the motor; the motor will also feed back an actually output rotation speed to the system through current feedback, so that the output rotation speed is close to a target rotation speed; an absolute value code wheel installed on the motor shaft can measure a length of the steel wire rope and an angle of rotation on the motor shaft; a tilt angle sensor installed at the end of the steel wire rope can measure a swing angle, so as to obtain a swing displacement and the resonance torque on the motor shaft an active filtering device generates a current with a same magnitude and an opposite direction as the resonance current and the resonance on the steel wire rope is eliminated by the method in step 2.

2. The harmonic elimination control method of the crane steel rope based on the active filtering technology according to claim 1, wherein the vector transformation control is based on coordinate transformation and comprises:

CLARK transformation transforming between three-phase stationary windings A, B, C and two-phase stationary windings α, β, which can be called as transformation between a three-phase stationary coordinate system and a two-phase stationary coordinate system, or called as CLARK transformation, referred to as 3/2 transformation for short, wherein:

taking an α axis and an A axis to coincide, wherein instantaneous magnetomotive forces of the two sets of windings are equal on α and β axes, which can be written in a matrix form:

$$\begin{bmatrix} i_\alpha \\ i_\beta \end{bmatrix} = \sqrt{\frac{2}{3}} \begin{bmatrix} 1 & -\frac{1}{2} & -\frac{1}{2} \\ 0 & -\frac{\sqrt{3}}{2} & \frac{\sqrt{3}}{2} \end{bmatrix} \begin{bmatrix} i_a \\ i_b \\ i_c \end{bmatrix}$$

the following equation is obtained by inverse transformation:

$$\begin{bmatrix} i_a \\ i_b \\ i_c \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_\alpha \\ i_\beta \end{bmatrix}$$

PARK transformation:
transforming from two-phase stationary coordinate systems α, β to two-phase rotating coordinate systems d, q, which is called two-phase rotating transformation, or PARK transformation, referred to as $C_{2r/2s}$ transformation for short, where s stands for stationariness and e stands for rotation;
relationships between $i_\alpha$ and $i_\beta$, and $i_d$ and $i_q$ are as follows:

$$\begin{cases} i_\alpha = i_d\cos\theta - i_q\sin\theta \\ i_\beta = i_d\sin\theta - i_q\cos\theta \end{cases}$$

which is written in a matrix form:

$$\begin{bmatrix} i_\alpha \\ i_\beta \end{bmatrix} = \begin{bmatrix} \cos\theta & -\sin\theta \\ \sin\theta & \cos\theta \end{bmatrix} \begin{bmatrix} i_d \\ i_q \end{bmatrix} = C_{2r/2s} \begin{bmatrix} i_d \\ i_q \end{bmatrix}$$

where:

$$C_{2r/2s} = \begin{bmatrix} \cos\theta & -\sin\theta \\ \sin\theta & \cos\theta \end{bmatrix}$$

the inverse transformation is $$C_{2r/2s} = \begin{bmatrix} \cos\theta & \sin\theta \\ -\sin\theta & \cos\theta \end{bmatrix}.$$

3. A harmonic elimination control device of a crane steel rope based on an active filtering technology for implementing the harmonic elimination control method of the crane steel rope based on the active filtering technology according to claim 1, wherein the harmonic elimination control device of the crane steel rope based on the active filtering technology comprises:
   an active filtering device configured for detecting a harmonic current based on an instantaneous reactive power theory, and offsetting the resonance current in the motor by generating a current with the same magnitude and the opposite direction as the resonance current in the motor;
   a torque feedback device configured for measuring the torque on the motor shaft;
   a current feedback device configured for measuring the three-phase current on the power shaft;
   a PI regulator configured for being a linear controller and used for forming a control deviation according to a given value and an actual output value, wherein a proportion and an integral of deviation are linearly combined to form a control quantity, so as to control a controlled object;
   CLARK inverse transformation configured for realizing transformation from the two-phase stationary coordinate systems a and f3 to the three-phase stationary coordinate systems a, b and c;
   PARK inverse transformation configured for realizing transformation from the two-phase rotating coordinate systems d and q to the two-phase stationary coordinate systems α and β;
   PWM configured for modulating a width of a series of pulses so as to obtain a required waveform equivalently;
   IGBT configured for being an insulated gate bipolar transistor and a fully controlled voltage-driven power semiconductor device composed of BJT and MOS, and used for high input impedance of an MOSFET and low on-voltage drop of a GTR.

4. A computer device, comprising a memory and a processor, wherein the memory stores a computer program; and the computer program, when executed by the processor, causes the processor to execute the harmonic elimination control method of the crane wire rope based on the active filtering technology according to claim 1.

* * * * *